United States Patent [19]

Watanabe

[11] Patent Number: 4,779,149
[45] Date of Patent: Oct. 18, 1988

[54] POSITIONING MECHANISM FOR A TRANSDUCER IN A MULTITRACK MAGNETIC TAPE APPARATUS OR THE LIKE

[75] Inventor: Takao Watanabe, Tokyo, Japan
[73] Assignee: Teac Corporation, Tokyo, Japan
[21] Appl. No.: 945,077
[22] Filed: Dec. 22, 1986
[30] Foreign Application Priority Data
Dec. 30, 1985 [JP] Japan ............................ 60-297998
Dec. 30, 1985 [JP] Japan ............................ 60-297999
[51] Int. Cl.$^4$ .......................... G11B 5/55; G11B 21/12
[52] U.S. Cl. ........................................ 360/78; 360/75; 360/109; 74/89.15
[58] Field of Search .................. 360/75, 78, 104, 105, 360/109; 74/89.15, 411.5, 424.8 R; 369/43, 44

[56] References Cited

U.S. PATENT DOCUMENTS

| 3,809,827 | 5/1974 | Oyaba .................................. 360/105 |
| 4,097,908 | 6/1978 | Chou et al. ........................ 360/109 |
| 4,333,116 | 6/1982 | Schoettle et al. ................... 360/78 |
| 4,394,696 | 7/1983 | Yoshimaru ........................... 360/78 |
| 4,717,978 | 1/1988 | Ichinose ............................ 360/109 |

Primary Examiner—Raymond F. Cardillo
Assistant Examiner—David L. Robertson
Attorney, Agent, or Firm—Woodcock Washburn Kurtz Mackiewicz & Norris

[57] ABSTRACT

A stepper motor is coupled via a motion translating mechanism to a transducer for transporting the latter across parallel tracks on a magnetic tape. The transducer has an abutment secured thereto. Rotatable about an axis parallel to the direction of transducer movement relative to the magnetic tape, a rotary stop member is geared to the stepper motor thereby to be driven in synchronism with the linear travel of the transducer. The rotary stop member has a stop arm protruding therefrom for engaging the abutment on the transducer when the latter moves to a limit position on one side of the tracks on the magnetic tape, thereby locking the stepper motor against rotation in one direction via the gearing. Preferably, the stop member has another stop arm engageable with the abutment when the transducer reaches another limit position on the other side of the tape tracks, with the consequent locking of the stepper motor against rotation in the other direction. An electronic control circuit can be incorporated with the head positioning mechanism for automatically initializing the position of the transducer on a home track on the magnetic tape.

13 Claims, 8 Drawing Sheets

POSITIONING MECHANISM FOR A TRANSDUCER IN A MULTITRACK MAGNETIC TAPE APPARATUS OR THE LIKE

BACKGROUND OF THE INVENTION

My invention is generally in the field of apparatus having a transducer such as a magnetic read/write head for reading and/or writing data on record media on which are formed a plurality or multiplicity of parallel tracks for the storage of such data. More specifically, my invention pertains to a mechanism in such data transfer apparatus for positioning the transducer with respect to the tracks on the record medium. The positioning mechanism of my invention is particularly well adaptable for use in apparatus for data transfer with a multitrack magnetic tape of cassette form, although I do not wish my invention to be limited to this particular application.

In the art of head positioning with respect to multitrack magnetic tape, it is not only a conventional, but rather a standard, design to employ an electric, bidirectional stepper motor in conjunction with a motion translating mechanism for transporting the head from track to track across the tape. Two U.S. patents are known to me that deal with the prior art. These are Yoshimaru U.S. Pat. No. 4,394,696 and Schoettle et al. U.S. Pat. No. 4,333,116. Both employ a lead screw as the motion translating mechanism.

Such head positioning mechanisms must transport the head across the tape between two predetermined limit positions on both sides of the parallel tracks. To stop the head exactly in at least one of these limit positions is of critical importance for subsequently transporting the head into precise alignment with the desired tracks. Either mechanical stops or optical sensors have usually been employed toward that end. Optical sensors with associated circuitry are rather expensive, and difficulties are involved in stopping the head in the exact positions required. Mechanical stops are less expensive and can more positively stop the head.

I have, however, found one serious weakness of the mechanical stops as heretofore constructed. The prior art stops have been fixedly disposed in the limit positions, with the head moving into direct abutment against them. Consequently, if the stepper motor remains in rotation after the head has come into abutment against either stop, as is required for subsequently initializing the head on a home track on the tape, then the full motor torque has been exerted on the motion translating mechanism. The threads of the lead screw and the part in engagement therewith have thus been susceptible to rapid abrasion, significantly shortening the useful life of the head positioning mechanism and, in consequence, of the entire data transfer apparatus.

SUMMARY OF THE INVENTION

I have hereby invented how to mechanically stop, in data transfer apparatus of the kind defined, the transducer exactly in one or two prescribed positions on a record medium without the noted difficulties encountered heretofore. In attaining this objective, moreover, I have found how to initialize the transducer on an exact home track on the record medium.

Briefly, my invention may be summarized as an apparatus for data transfer with a record medium having a plurality of parallel tracks on which data may be recorded, comprising a transducer movable across the tracks on the record medium as guided by guide means on fixed support means. Capable of bidirectional rotation in discrete steps, a stepper motor is coupled to the transducer via motion translating means whereby the directional rotation of the stepper motor is converted into the linear travel of the transducer back and forth in a transverse direction of the record medium. An abutment is formed in fixed relation to the transducer for joint movement therewith relative to the fixed support means. Mounted on the fixed support means for rotation about an axis parallel to the guide means, a rotary stop member is coupled via positive drive means such as gearing to the stepper motor thereby to be driven in synchronism with the linear travel of the transducer. The rotary stop member has a stop arm protruding therefrom for revolution therewith into and out of engagement with the abutment on the transducer. The angular and axial positions of the stop arm on the stop member are so determined with respect to the linearly variable position of the abutment that the stop arm moves into engagement with the abutment when the transducer is moved into alignment with a limit position on the record medium by the rotation of the stepper motor in a predetermined direction.

Thus, with the linear travel of the transducer, together with the abutment thereon, toward the limit position on the record medium, the stop arm on the rotary stop member will revolve past the abutment. The stop arm will come into position engagement with the abutment when the transducer reaches the limit position. As the rotary stop member is then locked against rotation, so is the stepper motor which is coupled to the rotary stop member via the gearing or like positive drive means. The transducer is thus restrained from movement beyond the limit position despite continued energization of the stepper motor.

Typically, the motion translating mechanism comprises a threaded spindle driven directly by the stepper motor, and an internally threaded member formed in fixed relation to the transducer and engaged with the threaded spindle.

It should be noted that the movement of the transducer is restricted not by a fixed stop arranged for direct contact therewith, as in the prior art, but by the rotary stop member geared or otherwise positively coupled to the stepper motor itself. Therefore, upon engagement of the stop arm with the abutment on the transducer, the stop member functions to positively arrest the rotation of the stepper motor itself via the gearing or the like. Not only is the transducer can thus be stopped exactly in the limit position, but also there is accordingly no likelihood of the intermeshing threads of the motion translating mechanism being ruined by the continued rotation of the stepper motor.

Additionally, the abutment on the transducer and the stop arm on the rotary stop member can be constructed for broad surface to surface contact with each other, as in the preferred embodiment of my invention disclosed herein. The output torque of the stepper motor can thus be firmly withstood without any rapid wear or deformation of the abutting members.

The above and other features and advantages of my invention and the manner of realizing them will become more apparent, and the invention itself will best be understood, from a stody of the following description and appended claims, with reference had to the attached drawings showing the preferred embodiment of my invention.

DESCRIPTION OF THE PREFERRED EMBODIMENT

General

Figure 1:
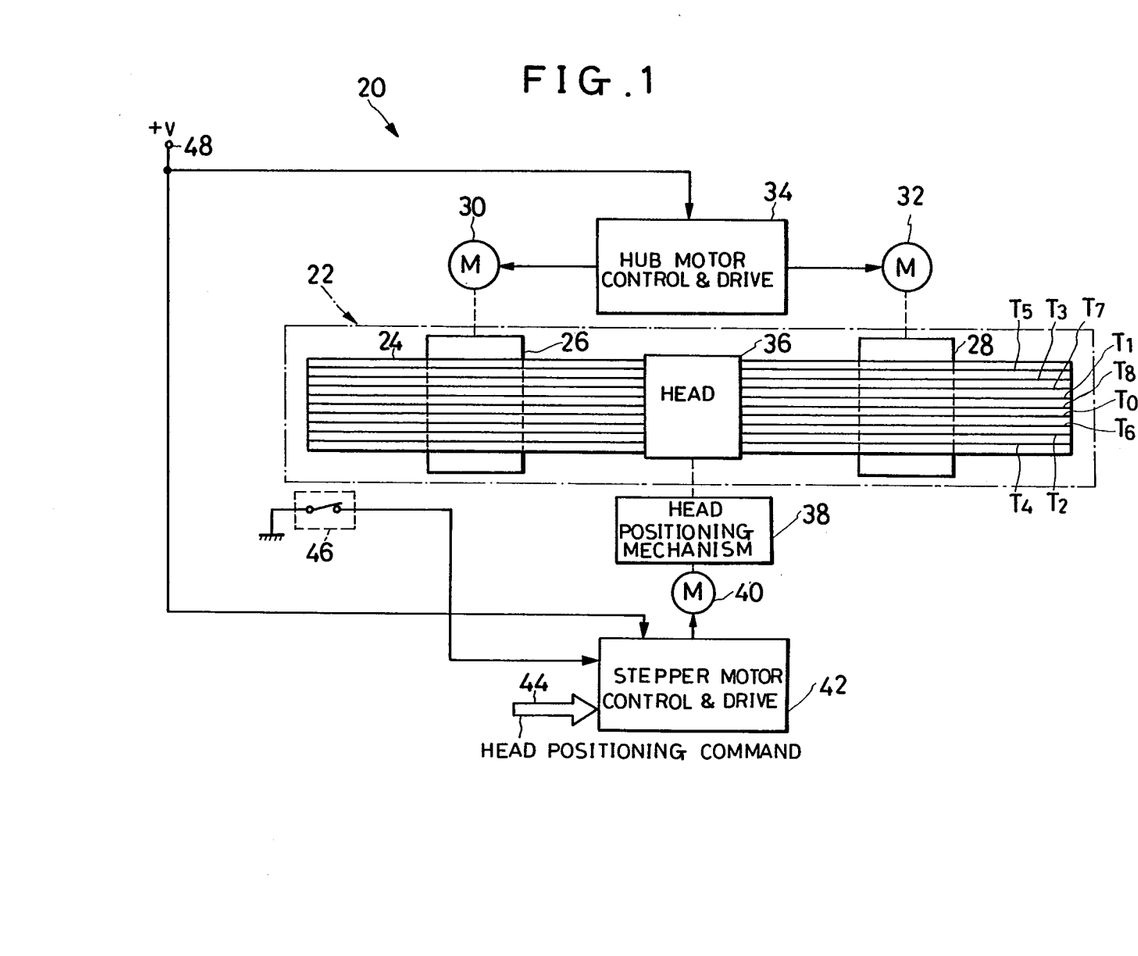
FIG. 1 is a block diagrammatic representation of a magnetic multitrack tape cassette apparatus in which there can be incorporated the mechanism for positioning the transducer in accordance with my invention.

I will now describe my invention in detail as applied to the multitrack magnetic tape cassette apparatus shown schematically in FIG. 1. Generally designated 20, the apparatus is herein shown together with the magnetic tape cassette 22 of standard multitrack construction. The tape cassette 22 has a length of magnetic tape 24 enclosed within a housing, not shown, and having its opposite ends anchored to a pair of hubs 26 and 28. The magnetic tape 24 has nine parallel tracks, designated T0 through T8, extending longitudinally of the tape.

Mounted in position within the apparatus 20, the tape cassette 22 has its hubs 26 and 28 coupled respectively to a pair of tape drive motors 30 and 32, preferably direct current motors. I understand that in FIG. 1, the magnetic tape 24 travels forwardly from left hand hub 26 to right hand hub 28, and reversely the other way around. The left hand motor 30 is therefore a reverse tape drive motor, and the right hand motor 32 a forward tape drive motor. Both tape drive mtors 30 and 32 are electrically coupled to a tape drive motor control and drive circuit 34. In response to a tape speed sensor, not shown, this circuit 34 energizes the tape drive motors 30 and 32 so as to provide a constant speed tape travel in both directions.

Japanese Laid Open Patent Application No. 60-85454 discloses the tape cassette 22 and the associated tape transport in greater details. I will, however, later elaborate on the arrangement of the tracks on the magnetic tape as the track arrangement bears particular pertinence to the positioning mechanism of my invention.

At 36 in FIG. 1 is shown a transducer which in this particular embodiment takes the form of a composite magnetic head assembly. The head assembly 36 is coupled to the head positioning mechanism 38 thereby to be transported transversely of the magnetic tape 24 for accessing the individual tracks thereon. The head positioning mechanism 38 is provided with, or includes, a stepper motor 40 of conventional design capable of bidirectional rotation in discrete steps. I understand that in this particular embodiment, one step of the stepper motor 40 is 15 degrees.

A stepper motor control and drive circuit 42 is electrically coupled to the stepper motor 40. A head positioning command is impressed from a host controller, not shown, to the circuit 42 by way of lines 44, causing the circuit 42 to energize the stepper motor 40 in a manner required for positioning the head assembly 36 on any desired track on the magnetic tape 24, as well as for initializing the position of the head assembly on a prescribed home track, to which I will refer presently. A cassette detector switch 46 is coupled to the circuit 42 for automatic initialization of the head position upon loading of the tape cassette 22 in the apparatus 20.

A supply terminal 48 is coupled to both motor control and drive circuits 34 and 42 for applying a supply voltage of, say, 12 volts thereto. Although not shown in FIG. 1, another power supply of, say, five volts is provided to the stepper motor control and drive circuit 42 for powering a microcomputer forming a part of this circuit.

Track Arrangement and Head Limit Positions on Tape

Figure 2:
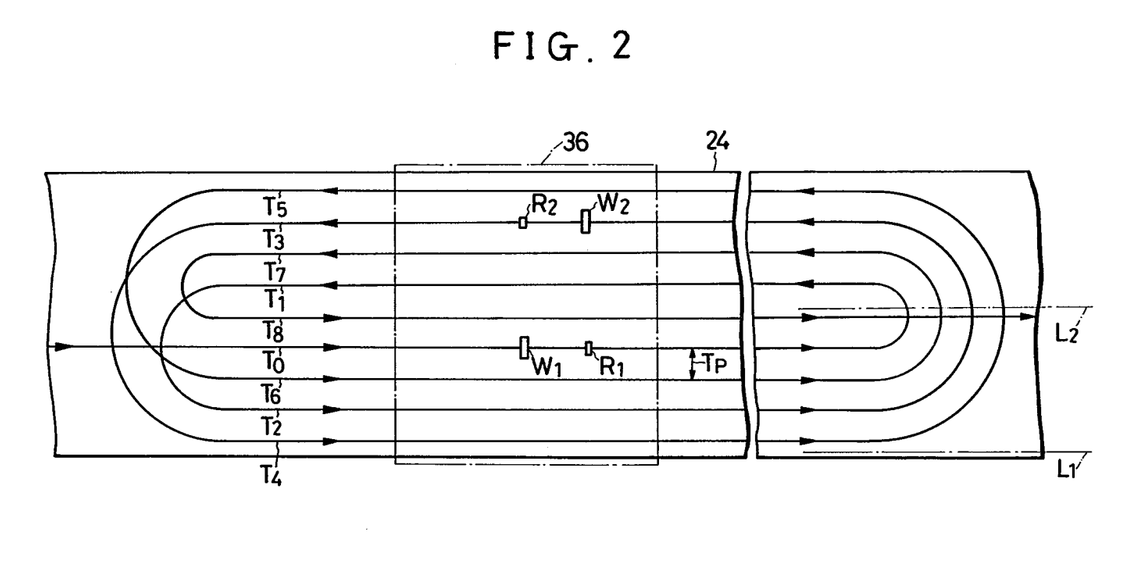
FIG. 2 is an enlarged partial plan view, partly shown broken away for illustrative convenience, of the magnetic tape in the apparatus of FIG. 1, the view showing in particular the arrangement of the tracks on the magnetic tape and the gap positions of the transducer scanning the tracks.

As illustrated on an enlarged scale in FIG. 2, the magnetic tape 24 has the nine tracks T0 through T8, each having a width of 0.2794 millimeter, arranged parallel to each other with a constant track pitch Tp. The width of the tape 24 may be 3.7846 millimeters. Tracks T8, T0, T6, T2 and T4 are disposed on the bottom half, as seen in this figure, of the tape 24, and Tracks T5, T3, T7 and T1 on the top half of the tape. Track T0 is joined to Track T1 at the right hand end, as seen in this figure, of the tape 24. Track T1 is joined in turn to Track T2 at the left hand end of the tape 24, and so forth, so that all the tracks are continuous.

As indicated by the arrowheads in FIG. 2, the tape 24 is fed forwardly for scanning the lower five tracks T8, T0, T6, T2 and T4 by the head assembly 36, and reversely for scanning the upper four tracks T4, T3, T7 and T1. Thus, as the traveling direction of the tape 24 is reversed upon completion of the scanning of each track, all the tracks can be scanned continuously in the order of T0, T1, T2, ... up to T8.

I have also illustrated in FIG. 2 the arrangement of the read and write gaps of the composite magnetic head assembly 36. The head assembly 36 has a formed write gap W2, a forward read gap R1, a reverse write gap W2 and a reverse read gap R2, in addition to the erase gaps which I have not shown by reason of their impertinence to my invention. The forward write gap W1 and read gap R1 are aligned longitudinally of the magnetic tape 24, so that they can be jointly positioned on any of the lower five tracks T8, T0, T6, T2 and T4. The reverse write gap W2 and read gap R2 are also aligned longitudinally of the tape 24 for joint positioning on any of the upper four tracks T5, T3, T7 and T1.

The spacing between the forward write and read gaps W1 and R1 and the reverse write and read gaps W2 and R2 is four times the track pitch Tp. Therefore, when the forward gaps W1 and R1 are aligned, for instance, with Track T0 as in FIG. 2, then the reverse gaps W2 and R2 are aligned with Track T3. The track pitch Tp of this particular tape cassette 22 is 0.4064 millimeter.

I have said that the stepper motor 40 rotates in steps of 15 degrees. The head positioning mechanism 38 of this particular embodiment linearly moves the head assembly 36 a unit distance of 16.933 microns with each step of the stepper motor 40. Accordingly, the head assembly 36 travels from one track to the next with every 24 steps of the stepper motor 40.

FIG. 2 further indicates at L1 and L2 the two limit positions on the magnetic tape 24 between which the head assembly 36 (more precisely, its forward write gap W1 and read gap R1) is permitted to travel across the tape. The first or lower limit position L1 is spaced downwardly from lowermost Track T4 a distance corresponding to the four steps of the stepper motor 40. The second or upper limit position L2 is spaced upwardly from Track T8 (the uppermost one of the five tracks on the lower part of the tape 24) a distance corresponding to the four steps of the stepper motor 40. The forward write gap W1 and read gap R1 of the head assembly 36 are movable between these limit positions L1 and L2 as they cover the lower five tracks T8, T0, T6, T2 and T4. The reverse write gap W2 and read gap R2 are, of course, moved with the forward write gap W1 and read gap R1 between the corresponding upper and lower limit positions for covering the upper four tracks T5, T3, T7 and T1.

Broadly speaking, however, the tape cassette 22 or any other record medium for use in the practice of my invention need not be reversible. My invention is applicable even if all the tracks are to be scanned in one direction only. Thus, in FIG. 2, the magnetic tape 24 may hav only the tracks T8, T0, T6, T2 and T4, or any number of such tracks to be scanned during the forward tape travel. The pair of limit positions L1 and L2 can therefore be thought of as being essentially disposed on both sides of the tracks.

It is to be understood that when I say hereinafter in this specification that the head assembly 36 is positioned on, or aligned with, any of the lower five tracks T8, T0, T6, T2 and T4 or of the upper and lower limit positions L1 and L2, I mean that the forward write gap W1 and read gap R1 of the head assembly is in alignment with that track or limit position.

The lower limit position L1 in particular must be exactly determined in relation to the tracks because it is a reference position from which the head assembly 36 is enabled to access the individual tracks. When the apparatus 20 is electrically turned on, the position of the head assembly 36 must be initialized on a prescribed home track on the magnetic tape 24 preparatory to the commencement of data transfer. The head assembly 36 is initialized on the home track after having been temporarily moved down to the lower limit position L1.

Let Track T0 be the home track for the forward write gap W1 and read gap R1. Then this home track is spaced three times the track pitch Tp from lowermost Track T4, which in turn is spaced from the lower limit position L1 a distance equivalent to four steps of the stepper motor 36. It will be seen, then, that the head assembly 36 can be initialized on the home track T0 by 76 steps ($=24\times 3+4$) of rotation of the stepper motor 40 after having been moved over to the lower limit position L1.

A Microswitch (trade name) or a sensing device has usually been employed heretofore for arresting the downward travel of the head assembly 36 in the lower limit position L1. A familiar alternative has been a fixed physical stop to be abutted upon by the head assembly 36, or by a part moving therewith, in the lower limit position L1. As will be detailed in the following, the head positioning mechanism 38 supersedes both of these conventional measures in view of their drawbacks pointed out previously.

Head Positioning Mechanism

FIGS. 3 through 13 are all directed to the head positioning mechanism 38. With reference directed first to FIGS. 3 through 6, which show the head positioning mechanism 38 in its state when the head assembly 36 is in the lower limit position L1, this mechanism 38 is mounted on a fixed baseplate 50 disposed horizontally. The stepper motor 40 is mounted to the underside of the baseplate 50. The head assembly 36 is secured via a metal insert 52 to a head mount 54, which in turn is placed upon the baseplate 50 for movement toward and away from the same. The head assembly 36 is therefore itself movable up and down with respect to the baseplate 50.

Figure 7:
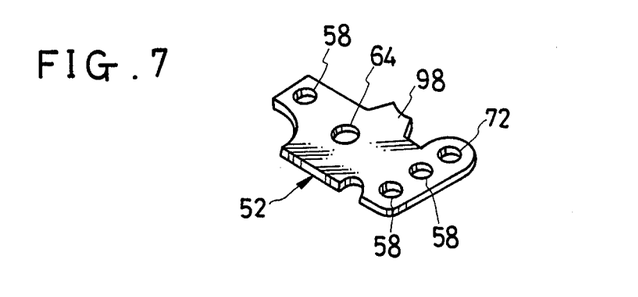
FIG. 7 is an enlarged perspective view of a metal insert used in the positioning mechanism of FIG. 3 to provide the abutment in fixed relation to the transducer.
Figure 8:
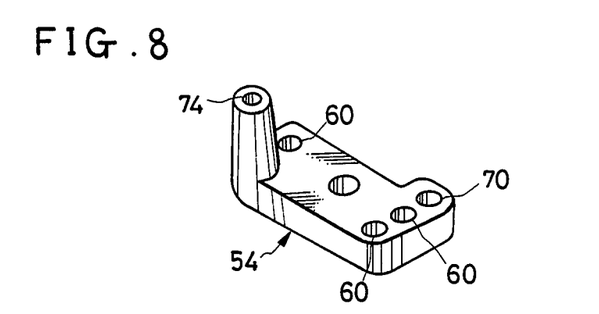
FIG. 8 is an enlarged perspective view of a transducer mount to which the transducer is fastened via the metal insert of FIG. 8 in the positioning mechanism of FIG. 3.
Figure 9:
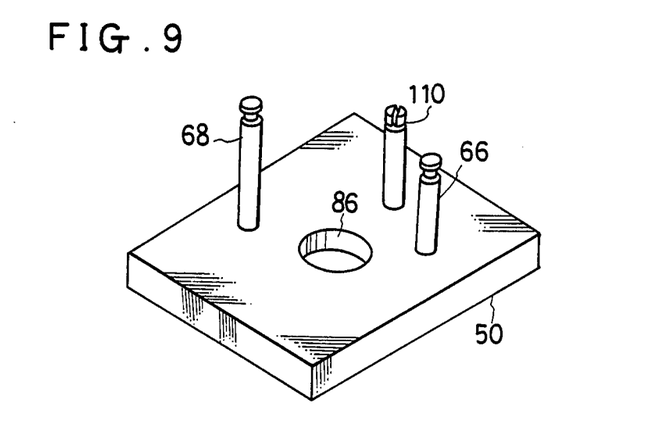
FIG. 9 is an enlarged perspective view of a fixed baseplate in the positioning mechanism of FIG. 3.

I have shown in more detail the metal insert 52 in FIG. 7, the head mount 54 in FIG. 8, and the baseplate 50 in FIG. 9. The metal insert 52 is fastened to the head mount 54 by three screws 56, FIGS. 3 and 4, passing through clearance holes 58 in the metal insert and engaged in tapped holes 60 in the head mount. The head assembly 36 is fastened to the metal insert 52 by a screw 62, FIGS. 3 and 4, extending through clearance holes, not shown, in the head assembly and engaged in a tapped hole 64 in metal insert.

Figure 3:
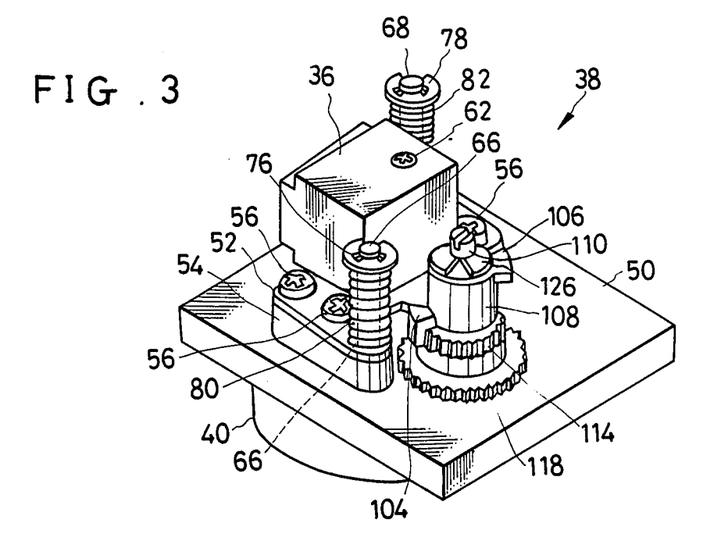
FIG. 3 is a perspective view of the positioning mechanism in the apparatus of FIG. 1, shown together with the transducer being held in a first limit position on the magnetic tape.

For guiding the up and down travel of the head assembly 36 together with the metal insert 52 and head mount 54, the baseplate 50 has two upstanding guide columns 66 and 68 rigidly formed thereon. The guide column 66 slidably extends through a hole 70 in the head mount 54 and a hole 72 in the metal insert 52. The other guide column 68 slidably extends through a hole 74 in the head mount 54. As best seen in FIG. 3, E rings 76 and 78 are mounted on the top ends of the guide columns 66 and 68 to serve as seats for helical compression springs 80 and 82 sleeved upon the respective guide columns. These compression springs serve the dual purpose of taking up the backlash between head assembly 36 and baseplate 50 and of biasing the head assembly toward the baseplate, that is, from the second L2 toward the first L1 limit positions. The head assembly 36 is to be moved from the first L1 toward the second L2 limit positions against the forces of the compression springs 80 and 82 by the stepper motor 40.

The rotation of the stepper motor 40 must be converted into linear motion for transporting the head assembly 36 along the guide columns 66 and 68. In this particular embodiment I have employed as the motion translating mechanism a threaded spindle 84 best seen in FIG. 6. Extending vertically through a clearance hole 86, FIG. 9, in the baseplate 50, the threaded spindle 84 has its bottom end rigidly coupled to the rotor 88 of the stepper motor 40. The threaded top end portion 90 of the spindle 84 is engaged in a tapped hole 92 in a flat portion 94. This flat member is screwed at 96 to the underside of the head mount 54. Thus, with the bidirectional rotation of the stepper motor 40, the head assembly 36 together with the metal insert 52 and head mount 54 is movable up and down relative to the baseplate 50 across the tracks on the magnetic tape 24.

I will now proceed to the explanation of the means for stopping the the linear travel of the head assembly 36 in the two limit positions L1 and L2 of FIG. 2. Forming a part of such stop means is the aforesaid metal insert 52, which is formed to include an abutment 98 of sectorial shape as seen in a plan view as in FIG. 4. Since the metal insert 52 is screwed to the head assembly 36, the abutment 98 is in fixed relatin to the head assembly. The abutment 98 has a pair of opposite side edges or surfaces 100 and 102 which converge as the abutment extends from the head assembly 36 in a direction away from the tape cassette 22. The angle between these converging side surfaces 100 and 102 of the abutment 98 may be approximately 40 degrees.

Movable into and out of abutting engagement with the opposite sides 100 and 102 of the abutment 98 are a first lower limit stop arm 104 and a second or upper stop arm 106, shown in all of FIGS. 3 through 6, which are both formed on a rotary stop member 108. This stop member is rotatable about a fixed shaft 110 on the baseplate 50, which shaft extends parallel to the guide columns 66 and 68, that is, in the direction in which the head assembly 36 is fed across the magnetic tape 24. The rotary stop member 108 is coupled, through positive drive means set forth in the following, to the stepper motor 40 for joint rotation therewith in synchronism with the linear travel of the head assembly 36, together with the abutment 98 thereof, across the magnetic tape.

Figure 10:
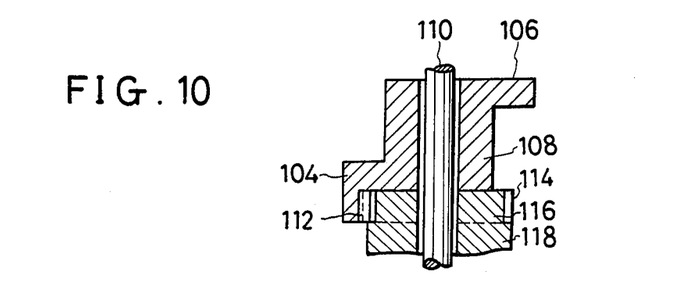
FIG. 10 is an enlarged, fragmentary section through the positioning mechanism, taken along the line X—X in FIG. 4 and showing in particular the rotary stop member.

As illustrated on an enlarged scale in FIG. 10, the lower limit stop arm 104 has a series of relatively fine pitch internal teeth 112 each extending parallel to the fixed shaft 110. The internal teeth 112 are normally in mesh with a series of external teeth 114 formed circumferentially on a wheel 116 rotatably mounted on the fixed shaft 100. Each external tooth also extends, of course, parallel to the fixed shaft 110. The toothed wheel 116 is formed coaxially and in one piece with an underlying driven gear 118, the latter being also rotatably mounted on the fixed shaft 110. As will be noted by referring back to FIGS. 5 and 6, the driven gear 118 is in constant mesh with a drive gear 120 nonrotatably mounted the threaded spindle 84 and interposed between baseplate 50 and head mount 54.

Thus the rotation of the stepper motor 40 is imparted via the intermeshing gears 118 and 120 to the toothed wheel 116 and thence, via the internal teeth 112 of the lower limit stop arm 104, to the rotary stop member 108. The number of the teeth on the drive gear 120 is half that of the teeth on the driven gear 118; that is, the driven gear 118, and therefore the rotary stop member 108, makes one complete revolution with every two revolutions of the drive gear 120 and therefore of the stepper motor 40.

Figure 4:
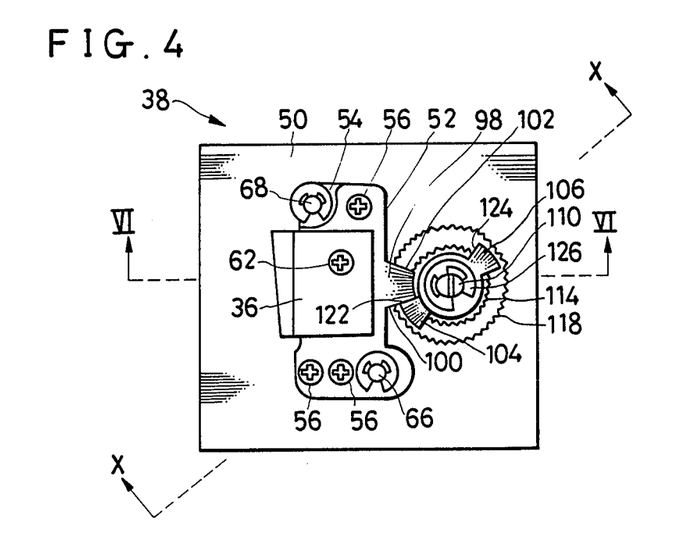
FIG. 4 is a top plan of the positioning mechanism of FIG. 3.

FIG. 4 best indicates that the lower limit stop arm 104 and upper limit stop arm 106 extends radially outwardly of the rotary stop member 108 with an angular pitch distance of 180 degrees therebetween. Further, as clearly seen in FIG. 5, the two stop arms 104 and 106 are spaced from each other in the axial direction of the rotary stop member 108. The axial distance between the stop arms 104 and 106 corresponds to the distance between the two limit positions L1 and L2, FIG. 2, on the manetic tape 24 between which the head assembly 36 is to be permitted to travel.

With reference directed once again to FIG. 4 the stop arms 104 and 106 are both sector shaped, as seen in a plan view as in this figure, diverging at an angle of approximately 30 degrees as they extend away from the rotary stop member 108. One side 122 of the lower limit stop arm 104 makes surface to surface contact with the side 100 of the abutment 98, as in FIG. 4, when the latter is aligned with the lower limit position L1 on the magnetic tape 24.

Figure 11:
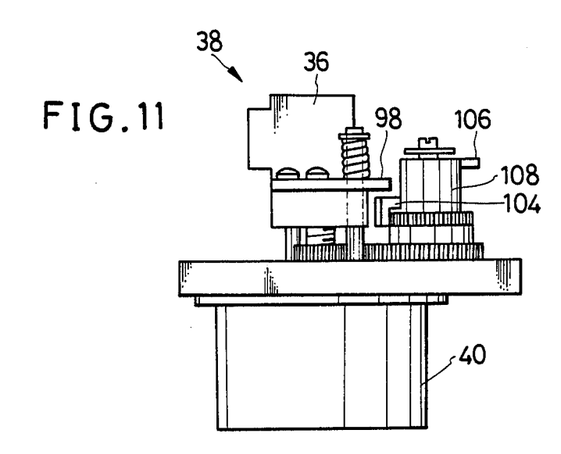
FIG. 11 is a view similar to FIG. 5 except that the transducer is shown midway between first and second limit positions on the magnetic tape.

As illustrated in FIG. 11, both stopper arms 104 and 106 revolve out of engagement with the abutment 98 during the upward travel of the head assembly 36 together with the abutment from the lower limit position L1 toward the upper L2. Then, exactly when the head assembly 36 reaches the upper limit position L2, one side 124 of the upper limit stop arm 106 makes surface to surface contact with the side 102 of the abutment 98, as pictured in FIGS. 12 and 13.

As will become more apparent as the description proceeds, the angular position of at least the lower limit stop arm 104 on the rotary stop member 108 must be adjustably variable on the fixed shaft 110 with respect to the linearly variable position of the abutment 98, in order to accurately determine the lower limit position L1 relative to the tracks on the magnetic tape 24. It is toward this end that the rotary stop member 108 is loosely mounted on the fixed shaft 110 is coupled to the driven gear 118 via the internal teeth 112 on the lower limit stop arm 104 and the external teeth 114 on the wheel 116. The rotary stop member 108 is not only rotatable on the fixed shaft 110 but also axially displaceable relative to the same. Therefore, with an E ring retainer 126 removed from the top of the fixed shaft 110, the rotary stop member 108 may be slid upwardly to an extent necessary to move the lower limit stop arm 104 out of engagement with the toothed wheel 116. After having had its angular position adjusted, the rotary stop member 108 may be slid down the fixed shaft 110 for the renengagement of the lower limit stop arm 104 with the toothed wheel 116.

I have mentioned that the head positioning mechanism 38 feeds the head assembly 36 a unit distance of 16.933 microns with each 15 degrees step of the stepper motor 40. Further, as the stepper motor makes one revolution with 24 steps, the head assembly travels the track pitch distance of 0.4064 millimeter from one track to the next. The lower limit position L1 is distanced four steps downwardly of the lowermost track T4 whereas the upper limit position L2 is distanced four steps upwardly of the uppermost track T8. The distance between the lowermost and uppermost tracks T4 and T8 is four times the track pitch Tp. Accordingly, the total number of stepper motor steps for the full stroke of the head assembly 36 between the limit positions L1 and L2 is:

$$24 \times 4 + 4 + 4 = 104.$$

The actual distance between the limit positions L1 and L2 is approximately 1.6391 millimeters.

The gear ratio of the intermeshing drive and driven gears 120 and 118 is one to two. Therefore, as the stepper motor 40 rotates with the drive gear 120 four revolutions and eight steps (120 degrees) for stroking the head assembly 36 between the limit positions L1 and L2, the driven gear 118 will rotate with the stop member 108 two revolutions and 60 degrees. The thicknesses or vertical dimensions and relative vertical positions of the abutment 98 on the head assembly 36 and the stop arms 104 and 106 on the rotary stop member 108 must be so determined that the stop arms will revolve out of contact with the abutment during the two revolutions and 60 degrees rotation of the stop member between the lowermost position of the head assembly 36 shown in FIGS. 4, 5 and 6 and its uppermost position of FIGS. 12 and 13.

Figure 5:
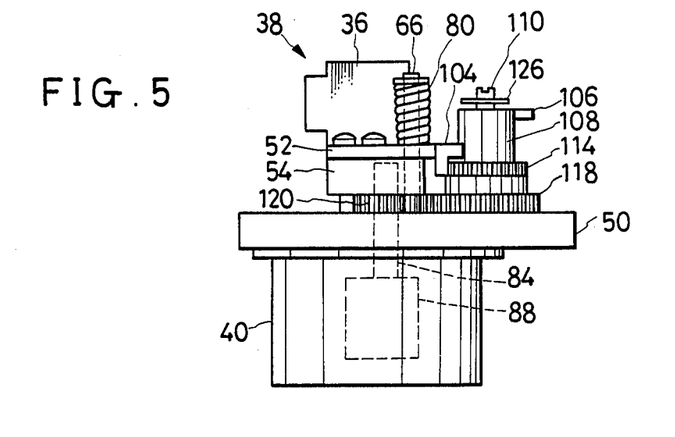
FIG. 5 is an elevation of the positioning mechanism as seen from the lower side of FIG. 4.
Figure 6:
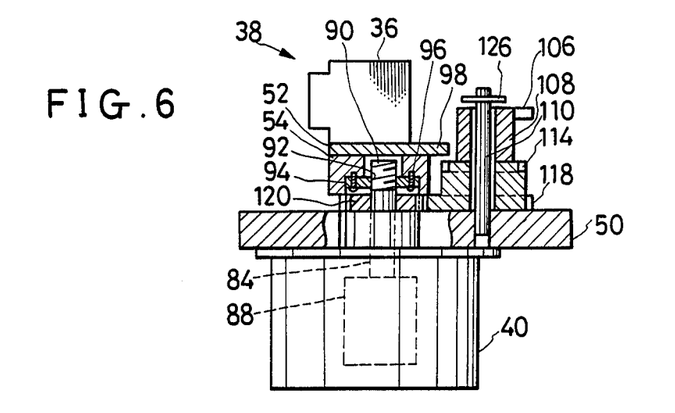
FIG. 6 is a section, partly in elevation, through the positioning mechanism, taken along the line VI—VI in FIG. 4.

Generally, for the attainment of the above objective, the abutment 98 must be sufficiently thin compared with the axial spacing between the stop arms 104 and 106, as will be noted from FIGS. 5 and 6. When the head assembly 36 is aligned with the lower limit position, the side 122 of the lower stop arm 104 is in contact with the side 100 of the abutment 98 as in FIG. 4. The other side of the lower stop arm 104 will come into vertical register with the other side 102 of the abutment 98 upon 290 degrees counterclockwise rotation, as viewed in FIG. 4, of the rotary stop member 108 with the travel of the head assembly 36 toward the upper limit position L1. The lower stop arm 104 should revolve, with the continued counterclockwise rotation of the stop member, past the abutment 98 without contacting it. In order to make this possible, I suggest that the relative vertical positions of the abutment 98 and lower stop arm 104 be such that the bottom surface of the abutment will rise above the plane of the top surface of the lower stop arm by the time the rotary stop member 108 rotates approximately 280 degrees in the counterclockwise direction from its FIG. 4 position. Toward this end the head positioning mechanism may be designed as follows.

Because of the one to two gear ratio of the drive and driven gears 120 and 118, the stepper motor 40 rotates 560 degrees for the 280 degrees rotation of the stop member 108. The head assembly 36 will rise 632.10 microns with the 560 degrees rotation of the stepper motor 40. Therefore, when the head assembly 36 is in the lowermost position of FIGS. 4 and 5, the abutment 98 and lower limit stop arm 104 may have their relative vertical positions fo preadjusted that they are in surface to surface contact with each other approximately 600 microns in the vertical direction. Upon subsequent 280 degrees rotation of the stop member 108 in the counterclockwise direction as viewed in FIG. 4, the abutment 98 will rise above the plane of the top surface of the lower limit stop arm 104. The lower limit stop arm will infallibly travel under the abutment 98 with the continued rotation of the stop member 108 and the upward travel of the head assembly 36.

Figure 12:
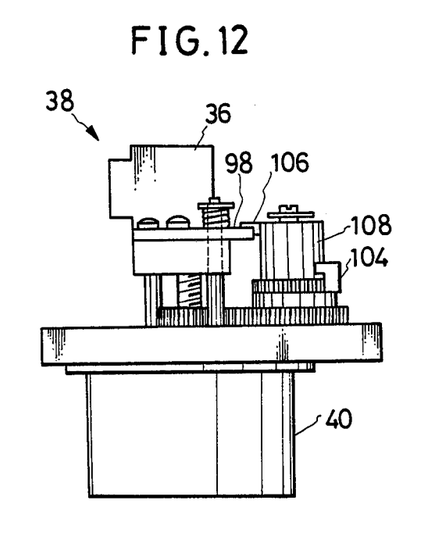
FIG. 12 is also a view similar to FIG. 5 except that the transducer is shown in the second limit position on the magnetic tape.
Figure 13:
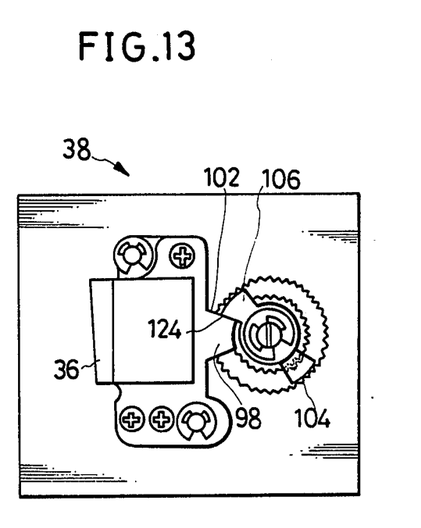
FIG. 13 is a view similar to FIG. 4 except that the positioning mechanism is shown in a state when the transducer is in the second limit position as in FIG. 12.

The lower limit stop arm 104 will pass under the abutment 98 two times, as in FIG. 11, during the time the head assembly 36 is traveling from its lowermost position of FIGS. 4, 5 and 6 to its uppemost position of FIGS. 12 and 13. The upper limit stop arm 106 will butt on the side 124 of the abutment 98, as in FIG. 13, when the head assembly 36 reaches the upper limit position.

Of course, the upper limit stop arm 106 will also travel two times over the abutment 98 during the travel of the head assembly 36 from its FIGS. 4 through 6 position to that of FIGS. 12 and 13. The upper surface of the abutment 98 will be very close to the upper limit stop arm 106 the second time the latter is traveling past the former. Then, after approximately 320 degrees of rotation of the stop member 108, the upper limit stop arm 106 will come into abutting contact with the side 102 of the abutment 98 as in FIG. 13. The area of contact between abutment 98 and upper limit stop arm 106 can thus be made sufficiently large for positively arresting the travel of the head assembly 36 in the upper limit position L2.

Stepper Motor Control and Drive Circuit

Figure 14:
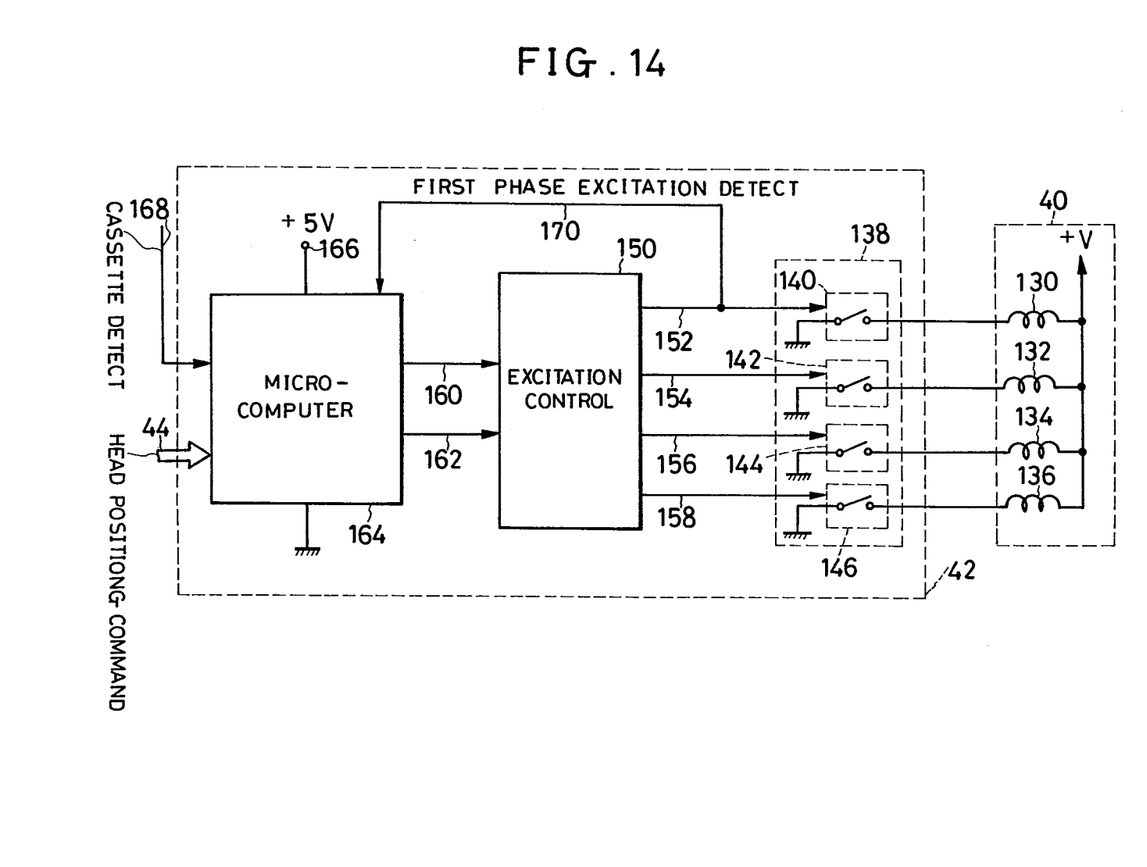
FIG. 14 is a schematic electrical diagram partly in block form, of the stepper motor control and drive circuit and the stepper motor itself in the magnetic tape apparatus of FIG. 1, the circuit being effective for initializing the transducer in the first limit position on the magnetic tape by controlling the stepper motor.

I have illustrated in detail in FIG. 14 the stepper motor control and drive circuit 42 together with the windings of the stepper motor 40. The particular stepper motor 40 of this embodiment is of four phase construction, comprising first to fourth phase windings 130, 132, 134 and 136 each having one extremity coupled to a positive supply terminal designated +V. Although I have shown only four windings for illustrative convenience, in practice the stepper motor may have several sets of such first to fourth phase windings. However, since all the windings of each phase are electrically interconnected and excited altogether, no inconvenience will arise if only one winding is shown for each phaase as in this figure.

The control and drive circuit 42 includes an excitation circuit 138 comprising first to fourth normally open switches 140, 142, 144 and 146 associated with the first to fourth phase windings, respectively, of the stepper motor 40. Each switch of the excitation circuit 138 is connected between the other extremity of one associated stepper motor winding and ground. In practice the switches 140 through 142 may taken the form of open collector NAND gates. Each switch when closed grounds the associated phase winding of the stepper motor 40 and so causes the same to be energized from the positive supply terminal +V.

For the on off control of the switches 140 through 142 the control and drive circuit 42 has an excitation control circuit 150 having four output lines 152, 154, 156 and 158 coupled respectively to the first to fourth switches of the excitation circuit 138. Two input lines 160 and 162 are connected to the excitation control circuit 150 for supplying stepping pulses and a stepping direction signal thereto. In response to these input signals the excitation control circuit 150 delivers excitation signals over the output lines 152 through 158 for sequentially closing the switches 140 through 142 in the downward or upward direction and hence for stepping the stepper motor 40 either forwardly or reversely in the single phase drive mode.

It is the office of a control circuit 164 to apply the stepping signal and stepping direction signal to the excitation control circuit 150 over the lines 160 and 162. Typically, the control circuit 168 takes the form of a microcomputer or central processor unit, coupled to its own supply terminal 166 to be fed with a supply voltage of, say, five volts. The unshown external controller is coupled as aforesaid to the microcomputer 164 by way of the lines 44 for supplying a head positioning command dictating the successive track positions on the magnetic tape 24 in which the head assembly 36 is to be placed. The microcomputer 164 responds to this head positioning command by delivering required numbers of stepping pulses and a required direction signal (up or down) to the excitation control circuit 150.

The cassette detector switch 46, FIG. 1 is also coupled to the microcomputer 164 by way of a line 168. In response to a cassette detect signal incoming when the tape cassette 22 is loaded in the apparatus 20, the microcomputer 164 will supply to the excitation control circuit 150 the stepping signal and stepping direction signal as required for initializing the position of the head assembly 36 on a prescribed home track, Track T0 for example, on the magnetic tape 24.

Additionally, the microcomputer 164 has coupled thereto a first phase excitation detect line 170 having its other extremity connected to the first output line 152 of the excitation control circuit 150. When the first phase winding 130 of the stepper motor 40 is being energized, the microcomputer 164 inputs by way of the line 170 a first phase excitation detect signal indicative of that fact. This excitation detect signal is for use in initializing the position of the head assembly 36 on the home track on the magnetic tape, as set forth in detail hereinbelow.

Initialization

I have designed the head positioning mechanism 38 so that it will coact with the electronics of FIG. 14 for automatically initializing the position of the head assembly 36 on the home track on the magnetic tape 24 preparatory to the commencement of data transfer between head assembly and magnetic tape. The head assembly 36 is temporarily transported down to the first limit position L1, the reference position, before being initialized on the home track. For such head initialization in accordance with my invention, the head positioning mechanism 38 must be adjusted in relation to the stepper motor 40 so that the head assembly 36 will come to the lower limit position L1 when a preselected one (first phase wnding 130 in this embodiment) of the first to fourth phase windings of the stepper motor 40 is being excited.

It is also necessary that the lower limit position L1 be exactly at a preassigned distance from the endmost one, Track T4 in the present case, of the tracks on the magnetic tape 24. For the accomplishment of this objective the lower limit position L1 may first be determined without regard to the track positions, the latter being then determinable with respect to the predetermined lower limit position. I suggest the following procedure for the predetermination of the lower limit position L1.

The stepper motor 40 may be stepped in a direction for moving the head assembly 36 toward a desired lower limit position to be determined. The actual lower limit position L1 may be determined anywhere in the neighborhood of the desired position when the first phase winding 130 of the stepper motor 40 is being energized. In all likelihood, however, the lower limit stop arm 104 of the rotary stop member 108 may not be in face to face contact with the side 100 of the abutment 98 when the head assembly 36 is in the thus established lower limit position L1. In that case, with the E ring 126 removed from the top end of the fixed shaft 110, the rotary stop member 108 may be moved upwardly to an extent necessary for the disengagement of the internal teeth 112 of the lower limit stop arm 104 from the external teeth 114 of the wheel 116. After having had its angular position changed as required, the rotary stop member 108 may be slid down the fixed shaft 110 so that the lower limit stop arm 104, reengaged with the toothed wheel 116, will butt on the side 100 of the abutment 98 when the head assembly 36 is in the lower limit position L1 with the concurrent excitation of the first phase winding 130 of the stepper motor 40.

With the foregoing preliminary adjustment completed, the apparatus is ready for the initialization of the head position. The microcomputer 164 built into the stepper motor control and drive circuit 42 will automatically start initialization either:

1. When the magnetic tape cassette 22 is loaded in the apparatus 20, with the latter already electrically turned on;

2. When the apparatus 20 is turned on with the tape cassette 22 already loaded therein; or 3. When an initialization command is delivered from the host controller, with the apparatus 20 already turned on and with the tape cassette 22 loaded therein.

Figure 15:
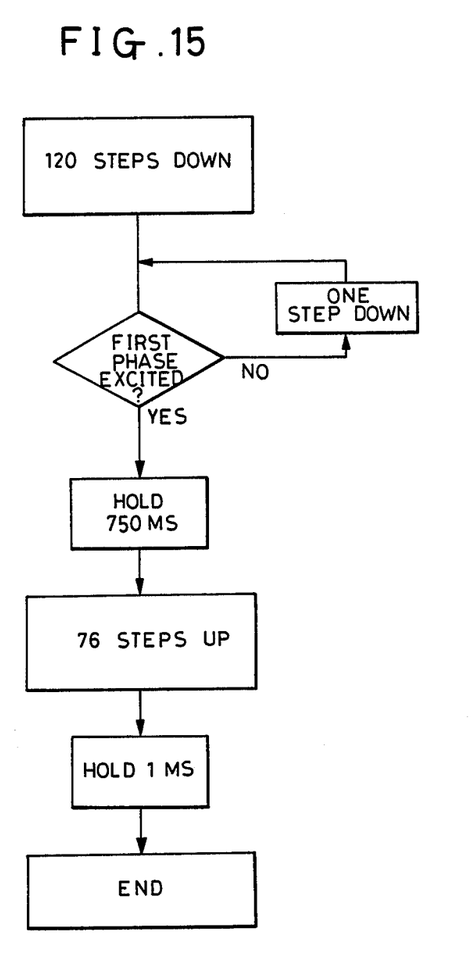
FIG. 15 is a flow chart explanatory of the initializing operation of the stepper motor control and drive circuit of FIG. 14.

The following description of the process of head initialization will be better understood by referring to the flow chart of FIG. 15 which represent the sequential steps taken by the microcomputer 164. The home track on which the head assembly 36 is to be initialized is understood to be Track T0.

The first step of head initialization is to lower the head assembly 36 to the lower limit position L1. The microcomputer 164 is programmed to put out, along with the stepping direction signal dictating the downward travel of the head assembly 36, the number of stepping pulses necessary for lowering the head assembly to the lower limit position L1. The head assembly 36 may be anywhere on the magnetic tape 24 in its transverse direction, including the upper limit position L2, at the time of the commencement of head initialization. It requires 104 steps of the stepper motor 40 for lowering the head assembly 36 from the upper L2 to the lower L1 limit position. I recommend, however, that the microcomputer 164 be programmed to put out a greater number of stepping pulses than is necessary for transporting the head assembly the full distance from the upper to the lower limit position. The recommended greater number of stepping pulses is 120 in the present case. Thus, first of all, the stepper motor 40 is driven 120 steps in the direction for lowering the head assembly 36 toward the lower limit position L1.

Naturally, the lower limit stop arm 104 of the rotary stop member 108 will come to butt on the side 100 of the abutment 98 when the head assembly 36 reaches the lower limit position L1 before the completion of the stepping down of the stepper motor 40 with the 120 pulses. The microcomputer 164 is programmed to continue the delivery of the remainder of the 120 stepping pulses to the excitation control circuit 150 after the head assembly 36 has reached the lower limit position L1. However, the continued supply of the stepping pulses will not result in the rotation of the stepper motor 40 because it is now positively locked against rotation by the rotary stop member 108 via the intermeshing gears 118 and 120. Only the windings of the stepper motor 40 will be sequentially excited as the excitation control circuit 150 sequentially closes the switches of the excitation circuit 138 in response to the remainder of the 120 stepping pulses.

It should be appreciated that the above continued energization of the stepper motor 40 after the head assembly 36 has reached the lower limit position L1 does not result in the destruction of the external and internal threads of the spindle 84 and member 94, both shown in FIG. 6, constituting the motion translating mechanism. The full output torque of the stepper motor 40 is transmitted not to the motion translating mechanism but, via the gears 118 and 120, to the lower limit stop arm 104 being held against the abutment 98. Being face to face contact with each other, the abutment 98 and lower limit stop arm 104 will suffer little or no wear or deformation over an extended period of use of this data transfer apparatus 20.

If the downward travel of the head assembly 36 were to be arrested by a fixed stop to be abutted upon by, for example, the head mount 54, as has been the case heretofore, then the full motor torque would be applied to the motion translating mechanism. The mating threads of the motion translating mechanism would then be ruined easily.

It will be recalled that we have determined the lower limit position L1 so that the head assembly 36 will be aligned therewith when the first phase winding 130 of the stepper motor 40 is being excited. Therefore, upon completion of the stepping down of the stepper motor 40 with the 120 pulses, it must be ascertained, with the head assembly 36 held in the lower limit position L1, whether the first phase winding 130 is being excited or not. It is toward this end that the output line 152 of the excitation control circuit 150 is coupled to the microcomputer 164 via the first phase excitation detect line 170. The microcomputer 164 is equipped to determine the excitation or nonexcitation of the first phase winding 130 from the first phase excitation detect signal supplied over the line 170.

If the first phase winding 130 is not being excited at that time, the microcomputer 164 will give another pulse for stepping down the stepper motor 40. The first phase excitation detect signal wil go high if the first phase winding 130 is excited in response to this first additional stepping pulse. If not, then the microcomputer 164 will give still another pulse for further stepping down the stepper motor 40. Being of the four phase construction, the stepper motor 40 will have its first phase winding 130 excited by one of up to three additional stepping pulses.

Upon lapse of 750 milliseconds after the first phase excitation detect signal has gone high, the microcomputer 164 will start putting out a series of 76 stepping pulses along with the stepping direction signal which now dictates the upward travel of the head assembly 36. Since Track T0, the home track, is distanced 76 steps above the lower limit position L1, the head assembly 36 will be positioned on the home track as the stepper motor 40 is stepped up 76 times. The microcomputer 164 will complete head initialization after a holding time of one millisecond.

Thus the head assembly has been accurately initialized on the home track without use of any sensing device for detecting its temporary return to the lower limit or reference position.

Possible Modifications

Although I have shown and described the data transfer apparatus of my invention very specifically and in terms of but one preferred form thereof, I recognize, of course, that various alterations, modifications or adaptations are possible in the details of the above disclosed apparatus without departing from the scope of my invention. The following is a brief list of possible modifications of the apparatus that we believe all fall within the scope of my invention:

1. The magnetic tape may be driven in one direction only for data transfer with the transducer.

2. The head positioning mechanism may be constructed to transport the transducer only between the opposite endmost ones of the parallel tracks on the record medium; that is, in the illustrated embodiment, the two limit positions L1 and L2 could be on the endmost tracks T4 and T8, respectively.

3. The rotary stop member 108 may be provided with only one stop arm (lower limit stop arm 104 in the illustrated embodiment) in cases where the transducer is somehow restrained from going beyond the second or upper limit position 12.

4. The invention may be applied to apparatus for data transfer with record media having circular tracks, with the transducer fed radially of the circular tracks, a typical example of such record media being the magnetic disk.

5. The transducer may be aligned with the first limit position when a winding other than the first phase winding of the stepper motor is being energized.

6. Various types of motion translating mechanisms other than that of the illustrated embodiment may be employed; for example, instead of the internally threaded member 94, a ball or pin may be rigidly mounted to the head mount 54 for engagement with the threaded spindle 84.

7. The microcomputer 164 of the stepper motor control and drive circuit 42 may be replaced by, for example, a network of logic elements, pulse generator, etc., capable of producing the stepping signal and direction signal for controlling the stepper motor as in the illustrated embodiment.

8. The microcomputer 164 need not have a power on sensor built into it for the commencement of head initialization; instead, a separate power on sensor or sensors may be provided for either or both of 12 and five volts power supplies, and the sensor or sensors and the cassette detector 46 may all be connected to an AND gate to provide an initialization command signal.

I claim:

1. An apparatus for data transfer with a record medium having a plurality of parallel tracks on which data may be recorded, comprising:
    (a) fixed support means;
    (b) guide means on the fixed support means extending transversely of the tracks on the record medium;
    (c) a transducer movable linearly along the guide means with respect to the fixed support means for accessing the individual tracks on the record medium;
    (d) a stepper motor capable of bidirectional rotation in discrete steps;
    (e) motion translating means for translating the bidirectional rotation of the stepper motor into the linear travel of the transducer back and forth across the tracks on the record medium;

(f) an abutment formed in fixed relation to the transducer for joint movement therewith relative to the fixed support means;

(g) a rotary stop member mounted on the fixed support means for rotation about an axis parallel to the guide means;

(h) positive drive means for imparting the rotation of the stepper motor to the rotary stop member, the positive drive means being effective to arrest the rotation of the stepper motor when the stop member is locked against rotation; and (i) a stop arm protruding from the rotary stop member for revolution therewith into and out of engagement with the abutment, the angular and axial positions of the stop arm on the stop member being so determined with respect to the linearly variable position of the abutment that the stop arm moves into engagement with the abutment, with the consequent locking of the stop member and therefore of the stepper motor against rotation in a predetermined direction, only when the transducer is moved into alignment with a limit position on the record medium by the rotation of the stepper motor in the predetermined direction, the limit position on the record medium being predetermined in relation to the tracks thereon in order to enable the transducer to access the individual tracks.

2. The data transfer apparatus of claim 1 wherein the motion translating means comprises:
   (a) a threaded spindle driven by the stepper motor; and
   (b) an internally threaded member engaged with the threaded spindle and mounted in fixed relation to the transducer.

3. The data transfer apparatus of claim 1 wherein the positive drive means comprises gearing.

4. The data transfer apparatus of claim 1 wherein the abutment and the stop arm are adapted to make surface to surface contact with each other upon engagement.

5. The data transfer apparatus of claim 1 further comprising means for adjustably varying the angular position of the stop arm on the rotary stop member with respect to the abutment.

6. The data transfer apparatus of claim 5 wherein the adjustably varying means comprises:
   (a) a fixed shaft on the fixed support means extending parallel to the guide means, the rotary stop member with the stop arm thereon being mounted on the fixed shaft for both angular and axial displacement relative to the same;
   (b) a toothed wheel rotatably mounted on the fixed shaft and coupled to the stepper motor via the positive drive means, the toothed wheel having formed on its circumference a series of external teeth each extending parallel to the fixed shaft; and
   (c) a series of internal teeth formed on the stop arm and each extending parallel to the fixed shaft, the internal teeth being movable into and out of engagement with the external teeth on the toothed wheel with the axial displacement of the rotary stop member on the fixed shaft.

7. The data transfer apparatus of claim 1 wherein the limit position on the record medium is disposed on one side of the tracks a predetermined distance away from an endmost one of the tracks.

8. An apparatus for data transfer with a record medium having a plurality of parallel tracks on which data may be recorded, the tracks being disposed between first and second preassigned limit positions on the record medium, the apparatus comprising:
   (a) fixed support means;
   (b) guide means on the fixed support means extending transversely of the tracks on the record medium;
   (c) a transaducer guided by the guide means for moving between the first and second limit positions on the record medium in order to access the individual tracks on the record medium;
   (d) a stepper motor capable of bidirectional rotation in discrete steps;
   (e) motion translating means for translating the bidirectional rotation of the stepper motor into the linear travel of the transducer back and forth across the tracks on the record medium;
   (f) an abutment formed in fixed relation to the transducer for joint movement therewith relative to the fixed support means;
   (g) a rotary stop member mounted on the fixed support means for rotation about an axis parallel to the guide means, the rotary stop member being positively driven by the stepper motor and being effective, when locked against rotation in either direction, to arrest the rotation of the stepper motor in the corresponding direction;
   (h) a first stop arm protruding from the rotary stop member for revolution therewith into and out of engagement with the abutment, the first stop arm moving into engagement with the abutment when the transducer is moved into alignment with the first limit position on the record medium, with the result that the transducer is prevented from traveling past the first limit position in a direction away from the second limit position; and
   (i) a second stop arm protruding from the rotary stop member for revolution therewith into and out of engagement with the abutment, the second stop arm moving into engagement with the abutment when the transducer is moved into alignment with the second limit position on the record medium, with the result that the transducer is prevented from traveling past the second limit position in a direction away from the first limit position.

9. The data transfer apparatus of claim 8 wherein the abutment and the first and second stop arms are all sector shaped, with the stop arms making surface to surface contact with the abutment when engaged therewith.

10. The data transfer apparatus of claim 8 wherein the rotary stop member is geared to the stepper motor to be positively driven thereby.

11. An apparatus for data transfer with a record medium having a plurality of parallel tracks on which data may be recorded, the tracks including a home track and being all disposed between first and second preassigned limit positions on the record medium, the first and second limit positions being spaced a known distance away from each other, with the first limit position disposed a known distance away from the home track, the apparatus comprising:
   (a) fixed support means;
   (b) guide means on the fixed support means extending transversely of the tracks on the record medium;
   (c) a transducer guided by the guide means for moving between the first and second limit positions on the record medium in order to access the individual tracks on the record medium, the transducer being initialized on the home track on the record medium;

(d) a stepper motor having a plurality of phase windings to be excited individually for bidirectional rotation in discrete steps, each step of the stepper motor being defined as the excitation of one phase winding thereof, the phase windings of the stepper motor including a predetermined one which is to be excited when the transducer is aligned with the first limit position on the record medium;

(e) motion translating means for translating the bidirectional rotation of the stepper motor into the linear travel of the transducer back and forth across the tracks on the record medium;

(f) an abutment formed in fixed relation to the transducer for joint movement therewith relative to the fixed support means;

(g) a rotary stop member mounted on the fixed support means for rotation about an axis parallel to the guide means, the rotary stop member being positively driven by the stepper motor and being effective, when locked against rotation in either direction, to arrest the rotation of the stepper motor in the corresponding direction;

(h) a first stop arm protruding from the rotary stop member for revolution therewith into and out of engagement with the abutment, the first stop arm moving into engagement with the abutment when the transducer is moved into alignment with the first limit position on the record medium upon excitation of the predetermined phase winding of the stepper motor, with the result that the transducer is prevented from traveling beyond the first limit position in a direction away from the second limit position despite the continued energization of the stepper motor;

(i) a second stop arm protruding from the rotary stop member for revolution therewith into and out of engagement with the abutment, the second stop arm moving into engagement with the abutment when the transducer is moved into alignment with the second limit position on the record medium, with the result that the transducer is prevented from traveling beyond the second limit position in a direction away from the first limit position; and (j) control means effective for initializing the position of the transducer on the home track on the record medium by:

(1) exciting the phase windings of the stepper motor a first preselected number of steps in a first prescribed sequence for moving the transducer to the first limit position on the record medium, the first preselected number of steps being greater than a known number of steps of the stepper motor required for moving the transducer the full distance from the second to the first limit position on the record medium;

(2) further exciting, if the predetermined phase winding of the stepper motor is not being excited upon completion of the excitation of the stepper motor the first preselected number of steps, the phase windings of the stepper motor in the first prescribed sequence until the predetermined phase winding becomes excited; and (3) further exciting in a second prescribed sequence, opposite to the first prescribed sequence, the phase windings of the stepper motor a second preselected number of steps required for moving the transducer from the first limit position to the home track on the record medium.

12. The data transfer apparatus of claim 11 wherein the control means comprises:

(a) an excitation circuit comprising a plurality of normally open switches connected one to each phase winding of the stepper motor, each switch when closed being effective to cause excitation of the associated phase winding of the stepper motor;

(b) an excitation control circuit for selectively closing the switches as dictated by a stepping signal and a stepping direction signal;

(c) excitation detector means for providing an excitation detect signal indicative of whether the predetermined phase winding of the stepper motor is being excited or not; and (d) a control circuit for delivering the stepping signal and the stepping direction signal to the excitation control circuit, the control circuit being further coupled to the excitation detector means for inputting the excitation detect signal therefrom.

13. The data transfer apparatus of claim 12 wherein the excitation control circuit of the control means has a plurality of output lines coupled one to each switch of the excitation circuit, and wherein the excitation detector means of the control means comprises a line connected between the control circuit and one of the output lines of the excitation control circuit which is associated with the predetermined phase winding of the stepper motor.

* * * * *

UNITED STATES PATENT AND TRADEMARK OFFICE
CERTIFICATE OF CORRECTION

PATENT NO. : 4,779,149

DATED : Oct. 18, 1988

INVENTOR(S) : Takao Watanabe

It is certified that error appears in the above-identified patent and that said Letters Patent is hereby corrected as shown below:

Col. 7, line 27, "stopping the the linear travel", delete "the" in the second occurrence.

Col. 9, line 61, change "fo" to -- so --.

Col. 10, line 6, change "uppemost" to -- uppermost --.

Col. 13, line 45, change "wil" to -- will --.

Signed and Sealed this

Thirty-first Day of October, 1989

Attest:

DONALD J. QUIGG

Attesting Officer

Commissioner of Patents and Trademarks